United States Patent [19]

Morin et al.

[11] 3,864,252

[45] Feb. 4, 1975

[54] METHOD OF APPARATUS FOR TREATING SEWAGE

[75] Inventors: Albert Z. Morin; Thomas H. Boyd, both of North Bay, Ontario, Canada

[73] Assignee: Trans-Continental Purification Research and Development Ltd., North Bay, Ontario, Canada

[22] Filed: Apr. 4, 1973

[21] Appl. No.: 347,800

[52] U.S. Cl. ............... 210/59, 110/75, 159/1 RW, 159/44, 159/46, 159/48 R, 210/63, 210/71, 210/152, 210/180
[51] Int. Cl. ............................................. C02b 1/18
[58] Field of Search .......... 110/75; 210/67, 71, 152, 210/175, 180, 59, 63; 159/1 RW, 4 A, 48 R, 46

[56] References Cited
UNITED STATES PATENTS

| | | | |
|---|---|---|---|
| 3,357,375 | 12/1967 | Brophy | 110/75 |
| 3,692,017 | 9/1972 | Glachant et al. | 165/145 |
| 3,734,035 | 5/1973 | Whitfield | 110/75 |
| 3,762,549 | 10/1973 | Crampton | 210/152 |

Primary Examiner—Samih N. Zaharna
Assistant Examiner—Peter A. Hruskoci

[57] ABSTRACT

The treatment of wastes such as domestic sewage and the like by a method of and apparatus for handling the run-off from a septic tank or other separating unit including the evaporation and/or burning of the outflow of such unit. In the case of a septic tank the solids progressively settle in a series of connected tanks where the eventual run-off is a relatively clear liquid. It is proposed to heat this fluid, discharging the water vapour to the atmosphere, and subject any combustible gases that are present to an open flame. The liquid, heated in one or more stages to a high temperature, is preferably sprayed as steam or gaseous vapour into an open flame to further raise the temperature of the steam and to ignite and burn off the combustibles. The steam in part may then be condensed and drained off as mainly distilled water while the remaining gaseous vapours are treated to a second open flame to burn off any residual combustile volatiles, with the products of combustion and reheated steam or water vapour being discharged to the atmosphere.

5 Claims, 3 Drawing Figures

PATENTED FEB 4 1975 3,864,252

Inventors
ALBERT Z. MORIN
THOMAS H. BOYD

Attorney

METHOD OF APPARATUS FOR TREATING SEWAGE

This invention relates to improvements in a method of and apparatus for treating sewage and the like and appertains more particularly to one for evaporating and burning sewage effluent components.

The disposal of wastes has become one of the major problems of our civilization, — the exhaust of motor cars; the emissions of industrial operations; the home discharges from toilet, bath, wash-basin and kitchen sink. The current pollution of our air, water and soil must be ameliorated if our planet and its inhabitants are to survive. In the larger centers of population, sophisticated sewage treatment plants are established but where regular sanitary sewer systems are not available, it is now usual to instal a septic tank with run-off tiles to adequate weeping beds. Many recreation areas where people seek escape from crowded cities are in so-called wilderness country with surface soil texture as the pre-cambrian shield area than cannot properly support septic tank weeping beds. As a result sanitary wastes are surfacing, finding their way into lakes and streams along which they are bordering, so water pollution is now a serious concern and is rapidly becoming critical.

Devices have been developed to reduce the volume of waste from water closets, and chemical and electrical toilets have been designed but this is only a partial answer and there is need for a better method of treating the total sanitary sewage of individual domestic establishments. Our present invention is intended to deal with all the household wastes discharged from bath, wash basin, sink, laundry tubs and toilet fixtures, regardless of the water consumption habits of the residents. This device is designed to receive the liquid effluent from a septic tank, or some other separating unit and satisfactorily, efficiently and effectively dispose of it by the evaporation and burning of components thereof.

Accordingly, an object of the invention is to provide for reducing pollution caused by sanitary wastes by a method of and apparatus for treating the clear liquid run-off from a septic tank, separating unit, lagoon, or the like.

A further object of the invention is to provide for the reduction of liquid waste discharge, preferably following some separation, to water vapour and gases.

A further object of the invention is to provide for the evaporation of the liquid output from a septic tank or other separating unit with the subsequent discharge of water vapour to the atmosphere and the burning of volatile combustible components.

A further object of the invention is to provide a sewage effluent treatment apparatus in which the liquid outflow from a separating unit is heated to a high temperature and sprayed as steam or gaseous vapour into an open flame, raising the temperature of the same and burning volatile combustible components thereof.

A further object of the invention is to provide an apparatus of the character described wherein at least some of the steam or water vapour may be condensed and drained off as mainly distilled water while the remaining gases are exposed to a second open flame to burn off any residual combustible volatiles.

A still further object of the invention is the provision of an apparatus as described capable of construction as a compact unit for mounting atop of or adjacent to a septic tank and having a fuel fired combustion chamber with an associated heating jacket in which the liquid outflow of the tank may be initially heated.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 2:
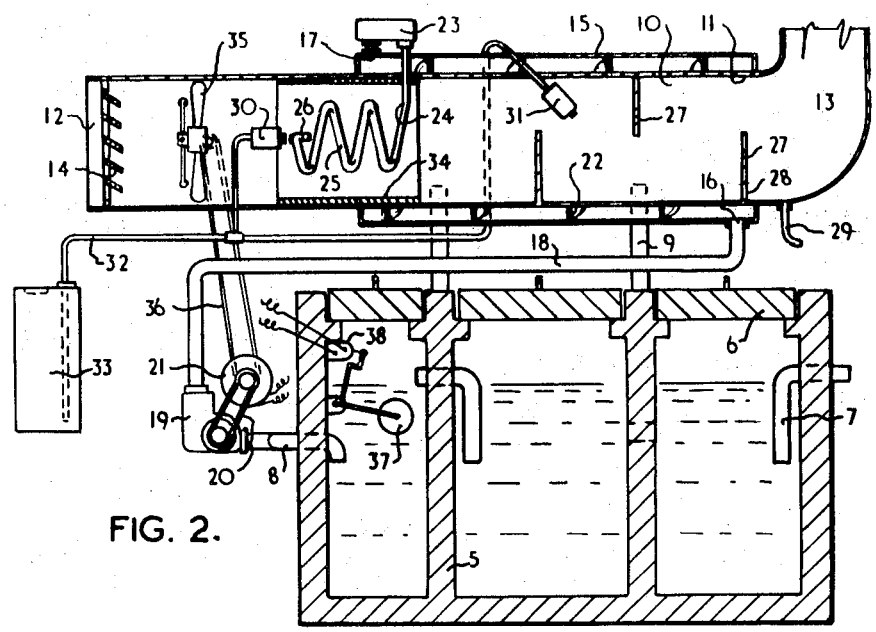
FIG. 2 is a vertical, longitudinal section thereof, as taken on the offset section line 2—2 of FIG. 1.
Figure 3:
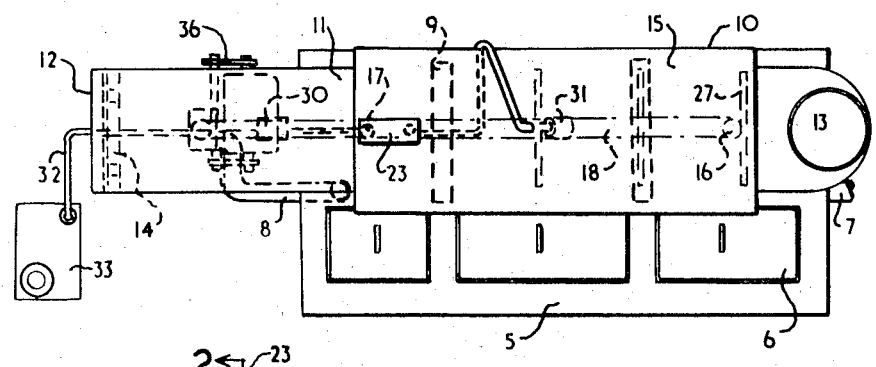
FIG. 3 is a plan view thereof.
Figure 1:
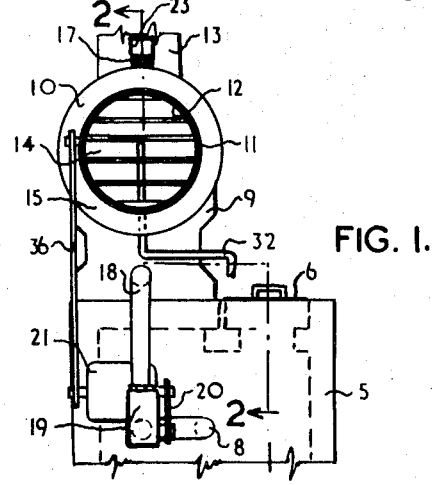
FIG. 1 is an end elevation of one preferred embodiment of the apparatus.

For carrying out this invention the preferred embodiment of the apparatus illustrated will be seen to comprise an assembly associated with a conventional septic tank 5, whose several compartments are normally closed with removable man-hole covers 6 located, as shown in FIGS. 1 and 2, toward one side of the top to allow for convenient access despite the superposed evaporating and burning unit. The usual sewage inlet pipe 7 is seen at the right hand end and the tank's liquid outlet pipe 8 at the left hand end.

A pair of transversely arranged vertical brackets 9 are spaced longitudinally on the septic tank 5 and support the evaporating-burning unit 10 above the tank and to one side of center thereof. The unit comprises generally an elongated horizontal cylinder 11 with an open inlet end 12 at the left and terminating in a communicating, upstanding, open stack 13 at the right. A one-way flow gate or valve such as the swinging louvre assembly 14 is positioned in the open inlet mouth 12 to prevent escape of obnoxious fumes therethrough. The cylinder constitutes the furnace or combustion chamber to which further reference will be made.

Surrounding this cylindrical combustion chamber 11 for a substantial part of its length is a water jacket 15, having an inlet port 16 at the bottom right and an outlet port 17 at the top left. A conduit 18 connects the tank outlet pipe 8 to the water jacket inlet port 16, such conduit including a pump unit 19 driven by belt 20 from an electric motor 21. A spiral baffle 22 may be disposed within the jacket to direct the liquid flow therethrough into better heat exchange relation with the wall of the envelope combustion chamber 11. The outlet port 17 connects with an automatic feed control valve 23 from which a feed pipe 24 extends that enters the combustion chamber 11, describes a number of convolutions in a coil 25 reaching toward the chamber's inlet 12 and terminates in an open spray nozzle 26 positioned axially of the chamber and discharging in the direction of the chamber's stack end.

Downstream from the nozzle 26 and about evenly spaced longitudinally of the chamber between the coil 25 and the stack 13, a plurality of offset baffles 27 are arranged, the first and third rising from the bottom and the second one depending from the top. It will be noted that the third baffle has an opening 28 at the bottom center and just beyond it a drain pipe 29 leads from the bottom of the combustion chamber.

Immediately ahead of and axially aligned with the spray nozzle 26 of a fuel burner 30 is disposed while a second fuel burner 31 is positioned near the top of the chamber 11 approximately over the first baffle 27 and is directed downwardly at about 45° toward the passage under the second baffle. These burners are conventional automatically ignited open flame jets supplied by fuel by pipe lines 32 from a supply tank 33. Because of the intense heat generated in the area of the first burner 30, which incidentally lies forward of the front end of the water jacket 15, it is desirable to provide the inside of the chamber 11 with a lining 34 of suitable refractory material.

In the front or entrance end of the chamber cylinder, between the louvered inlet 13 and the first burner 30, a fan 35 is mounted, being here shown as driven by a belt 36 from motor 21.

As the input to the septic tank 5 is intermittent and unpredictable, the operation of the evaporator and burner apparatus is made conditional on the liquid level in the tank, for which purpose a float 37 near the outlet pipe 8 reaching a predetermined height actuates a switch 38 that closes the energizing circuits to the motor 21 for the pump 19 and fan 35 as well as the fuel burners 30 and 31.

In operation, on the signal from the float 37, the burners 30 and 31 are ignited, the fan 35 is set in motion, the liquid pump 19 sends fluid by pipe 18 into the jacket 15 where it is heated progressively as it moves from the inlet 16 toward the outlet 17 and then as it is fed by the control valve 23 it enters the coil 25 under full blast of the jet 30 to be raised to the boiling point (approximately) to emerge as a spray of steam or gaseous vapour into the open flame. Here the temperature is again raised and combustible gases are ignited and burnt. Then as the steam and water vapour flows over the first baffle 27 and under the second they serve to heat the contents of the liquid jacket 15 but are in turn cooled to some degree causing condensation to run down the sides of the chamber and flowing under the third baffle by the port 28 to pass out as mainly distilled water through the drain pipe 29. Simultaneously, as the hot gases pass over the first baffle they are subjected, ere passing under the second baffle, to the second burner's open flame where any residual combustible volatiles are consumed, the total products of combustion and remaining water vapours flowing up the stack 13 to be discharged to the atmosphere.

From the foregoing description taken in connection with the accompanying drawings, it will be manifest that a method of and apparatus for treating sewage is provided that will fulfil all the necessary requirements of such a method and apparatus, but many changes could be made in the above description and many apparently widely different embodiments of the invention may be practiced and constructed without departing from the spirit or scope of the invention.

What is claimed is:

1. A method of treating clear run-off from a septic tank, separating unit, lagoon, or the like comprising the steps of heating the liquid waste to a high temperature near 212°F producing steam and water vapour, spraying such steam and water vapour into an open flame to raise the temperature of said steam and vapour and burn any volatile combustibles therein, and releasing at least some of said steam, water vapour and the products of combustion to the atmosphere, wherein the heating consists of initially warming the liquid waste and subsequently raising the temperature thereof in the area of the open flame to a high temperature near 212°F and wherein the steps of heating, evaporating and burning are carried out in an enclosed elongated horizontal passage through which a forced air stream is passed from an open air inlet at one end to a vertical outlet to the atmosphere at the other end, characterized in that the initial warming of the liquid waste is produced by progressively moving said liquid waste in a heating jacket surrounding said passage and in a direction from the outlet end toward the inlet end of said passage and in heat exchange relation with said passage in which the burning is carried out and the subsequent raising of the temperature of said liquid waste to a high temperature near 212°F is obtained by moving said liquid waste in a direction leading toward the air inlet end of said passage and in a feeding coil in the immediate vicinity of the open flame where the direction of travel of said liquid waste is reversed so it is sprayed into the flame in a direction leading toward the outlet end of said passage.

2. The method of claim 1, further characterized in that the initial warming of the liquid waste produced by progressively moving it in a heating jacket surrounding said passage and in a direction leading from the outlet end toward the air inlet end of said passage and in heat exchange relation with said enclosed, elongated, horizontal passage in which the burning is carried out, includes the input of the liquid waste into said jacket for heat exchange with said passage at a point below the outlet end of said passage and the output from said jacket for subsequently raising the temperature of said liquid waste before spraying into said open flame, wherein the steam, water vapour and products of combustion from the first open flame burning are subject to a second open flame to further evaporate the water vapours and burn off any residual combustible volatiles, with some of the water vapours being condensed and drained off as mainly distilled water before the remaining vapour and products of combustion are released to the atmosphere.

3. An apparatus for treating sewage effluent such as the clear liquid run-off from a septic tank or the like comprising an elongated horizontal combustion chamber having an air inlet opening at one end and a discharge opening at the other; a fuel fired open flame burner in said combustion chamber near the inlet end; a liquid discharge nozzle adjacent said burner; a liquid heating jacket enveloping said combustion chamber between said burner and the chamber discharge opening end, means connecting said jacket with said nozzle; means for feeding said sewage liquid run-off to said jacket and a heating coil disposed concentrically within said chamber the convolutions of said coil leading upstream toward said burner and terminating in said discharge nozzle that is directed downstream, the sewage liquid feeding means connecting with the end of said jacket near the discharge opening end of said combustion chamber and the means connecting said jacket to said nozzle extending from the end of the jacket near the air inlet opening of the combustion chamber to said coil, whereby the liquid is progressively heated in the jacket and subsequently raised to a high temperature in the coil that suurrounds the open flame of said burner so as to discharge from said nozzle as steam and gaseous vapours.

4. The apparatus of claim 3, having staggered baffles arranged in said chamber toward the discharge opening end, a second burner in such baffled discharge opening end of the chamber directed in line with the flow of gases therethrough from the air inlet opening end of the chamber to the discharge opening end, a liquid drain in the bottom of the chamber at the discharge opening end for the escape of any condensed liquid, a motor driven fan near the inlet opening end of the chamber and a one-way flow damper between said fan and the inlet opening end.

5. The apparatus of claim 4, having a pump for the sewage liquid feed, a drive motor connected therewith, means connecting said motor also with said fan, a float level actuated circuit closer for said motor, and an automatic pressure valve in the sewage liquid feed between said pump and said nozzle.

* * * * *